United States Patent
Neuf et al.

(10) Patent No.: US 6,904,998 B2
(45) Date of Patent: Jun. 14, 2005

(54) DEVICE AND METHOD TO ENSURE THE STEERABILITY OF AN INDUSTRIAL TRUCK

(75) Inventors: Ottmar Neuf, Reinbek (DE); Rainer Bavendiek, Wentorf (DE); Recep Macit, Düsseldorf (DE)

(73) Assignee: STILL GmbH (DE)

( * ) Notice: Subject to any disclaimer, the term of this patent is extended or adjusted under 35 U.S.C. 154(b) by 163 days.

(21) Appl. No.: 10/093,082

(22) Filed: Mar. 7, 2002

(65) Prior Publication Data

US 2003/0005848 A1 Jan. 9, 2003

(30) Foreign Application Priority Data

Mar. 8, 2001 (DE) .......................................... 101 11 234

(51) Int. Cl.⁷ ............................................... B62D 5/30
(52) U.S. Cl. ..................................... 180/406; 180/442
(58) Field of Search ................................ 180/400, 403, 180/406, 417, 421–423, 442

(56) References Cited

U.S. PATENT DOCUMENTS 4,619,285 A * 10/1986 Piet .......................... 137/68.13
5,022,481 A * 6/1991 Carter ......................... 180/406
5,862,878 A    1/1999 Bohner et al.
5,950,757 A    9/1999 Saita et al.

FOREIGN PATENT DOCUMENTS

| DE | 75 23 006 U1 | 2/1977 |
| DE | 195 46 733 C1 | 3/1997 |
| DE | 197 52 397 A1 | 6/1998 |
| DE | 199 21 436 A1 | 11/2000 |
| DE | 199 26 495 A1 | 12/2000 |
| GB | 2 349 919 A | 11/2000 |

* cited by examiner

Primary Examiner—Lesley D. Morris
Assistant Examiner—Mathew Luby
(74) Attorney, Agent, or Firm—The Webb Law Firm

(57) ABSTRACT

The invention relates to a device and a method to ensure the steerability of an industrial truck that has a hydraulic steering system. The invention includes at least one gas generation cartridge (8) and a device (16) to activate the generation of the gas. The invention teaches that energy is available in an emergency for the hydraulic circuit of a hydraulic steering system. On the side of the gas generation cartridge (8), when there is a need to supply energy to the hydraulic circuit, pressure is increased which can then be transmitted to the hydraulic medium. The invention makes available an advantageous emergency power supply system for a hydraulic steering system of an industrial truck.

12 Claims, 2 Drawing Sheets

DEVICE AND METHOD TO ENSURE THE STEERABILITY OF AN INDUSTRIAL TRUCK

CROSS-REFERENCE TO RELATED APPLICATION

This application corresponds to German Application No. 101 11 234.3 filed Mar. 8, 2001, herein incorporated by reference in its entirety.

BACKGROUND OF THE INVENTION

1. Field of the Invention

This invention relates to a device and a method to ensure the steerability of an industrial truck that has a hydraulic steering system and, in one embodiment, to an emergency steering device for an industrial truck.

2. Technical Considerations

Hydraulic steering systems are the standard steering systems on industrial trucks that have a driver's seat. With this type of steering system, the steering force exerted by the driver (if the vehicle is equipped with a mechanical steering system) is hydraulically assisted. A hydraulic pump is driven by the motor of the industrial truck. The steering force is amplified by the pressure that is exerted on the steering cylinder by the hydraulic medium. In a fully hydraulic steering system, the vehicle can only be steered when the motor is running. A hydraulic steering system can also be electrically assisted (i.e., electro-hydraulic steering).

The prior art discloses hydraulic or electro-hydraulic steering systems that have a second steering pump as a redundant component that can be used if the primary steering pump fails. The purpose of such an arrangement is to guarantee that the industrial truck can be steered or at least be brought into a safe position even after the failure of the first steering pump. Equipping the vehicle with redundant components entails high costs.

The prior art also discloses a hydraulic steering system that has a pressure reservoir instead of the second steering pump. The hydraulic reservoirs of the prior art transmit energy to the hydraulic medium as needed. This method of supplying energy also makes it possible to bring the industrial truck into a secure position in which a repair can then be performed, for example. Normally, the pressure reservoir used has a gas cushion under pressure on one side, a membrane in the middle, and the hydraulic medium on the other side. These systems have a limited useful life on account of the changing pressure load exerted on the membrane. For this reason, the systems of the prior art are maintenance-intensive and expensive.

Therefore, it is an object of the invention to ensure the steerability of an industrial truck in a simple and economical manner, at least for the length of time that is necessary to bring the industrial truck into a safe position.

SUMMARY OF THE INVENTION

The invention provides a system, e.g., an emergency steering system, having at least one gas generation cartridge as well as means for the activation of a gas generation. Consequently, energy is available when necessary for the hydraulic circuit of a hydraulic steering system. By means of the gas generation cartridges, pressure is built up to supply energy to the hydraulic circuit and can then be transmitted to the hydraulic medium. The result is that an advantageous emergency energy supply system is available for the hydraulic steering system of an industrial truck.

There can be a control system which can actuate means for the activation of the gas generation. For example, an electrical activation mechanism can be provided as a means for the activation of the gas generation.

Special preference is given to monitoring of the pressure for a hydraulic circuit of the hydraulic steering system. It is thereby easily possible to identify a problem with the steering system which can be caused, for example, by a malfunction or failure of the steering pump. The measurements from the pressure monitoring system can be used as input values for the control system.

The invention teaches that it is advantageous to provide a vessel or container with which the gas generation cartridge is in communication, and the interior of which can be placed in communication with the hydraulic circuit of the steering system.

In a further advantageous configuration of the invention, a membrane can be located in the container. The membrane can separate a space provided for the gas from a space provided for the hydraulic medium. This membrane makes it possible to use a wide range of gases in the gas generation cartridge(s) because the gases do not come in contact with the hydraulic medium.

It is particularly advantageous if a pyrotechnic cartridge is provided as the gas generation cartridge. For example, a pyrotechnic cartridge of the type used in vehicle airbag systems can be used.

In an additional embodiment of the invention, a gas pressure vessel can be provided as the gas generation cartridge. The invention teaches that it is particularly advantageous to provide a gas pressure vessel that is filled with carbon dioxide. Commercially available carbon dioxide pressure vessels can be used, for example.

One advantage of the invention is that the gas generation cartridge pressurizes the space in which it is located for a certain length of time. The gas chamber which is defined by the membrane, for example, thereby expands, as a result of which the pressure is transmitted to the hydraulic medium which is located on the other side of the membrane and, therefore, energy is available if required for the emergency supply of the steering system of an industrial truck. It is particularly advantageous if the device of the invention has one or more gas generation cartridges. A plurality of gas generation cartridges can be used with particular advantage, for example, as redundant systems to improve the reliability of the device.

It is further advantageous that the pressure can be increased very rapidly when necessary, for example by means of an electrical activation of the gas generation.

In terms of the method, the invention teaches that a gas generation can be activated when the pressure in a hydraulic circuit of the hydraulic steering system decreases. The gas generation can be activated when the pressure drops below a predefined limit.

It is appropriate if a gas generation cartridge is used to generate the gas. In one particular embodiment of the invention, a pyrotechnic cartridge can be used as the gas generation cartridge. In an additional advantageous configuration of the invention, a gas pressure vessel can be used as the gas generation cartridge.

A control system can actuate means for the activation of the gas generation. This control system can advantageously make one or more measured variables taken from the steering system available as input values. For example, the measurements from a pressure monitoring system can be used as input values to control the activation of the gas generation. The setpoint signal for the desired direction of travel originating from the steering wheel or joystick can also be used as an input signal for the control system explained here by way of example.

Particular preference is given to the measurement of the pressure in the hydraulic circuit of the steering system. When the pressure is monitored, any disruption in the hydraulic circuit can advantageously be identified rapidly and reliably. One example of a disruption that can be identified in this manner is the failure of the steering pump.

In one embodiment of the invention, the gas generation can be activated if at least one measured pressure value is below a defined limit value.

It is advantageous if, when the gas generation is activated, the gas is discharged into a vessel, the interior of which can be placed in communication with the hydraulic circuit. It is particularly advantageous if the vessel is connected to the hydraulic circuit so that the pressure increase in the vessel caused by the gas generation counteracts the pressure drop in the hydraulic circuit. It is particularly advantageous if, for example, a membrane that is installed in the vessel and separates a space provided for gas from a space provided for hydraulic medium transmits the pressure that is increased by the activation of the gas generation in the space provided for gas to the hydraulic medium.

The invention offers a whole series of additional advantages over known emergency steering devices.

Because a steering system of the invention can be constructed in the form of a single-circuit system and the invention eliminates the need for an expensive redundant system such as a second steering pump, for example, reductions become possible in terms of costs, the space required, the number of components, and the amount of maintenance work required.

In addition to the elimination of the need for maintenance-intensive conventional pressure reservoirs, an additional advantage of the invention is that it very rapidly and reliably makes a large amount of energy available when needed.

BRIEF DESCRIPTION OF THE DRAWINGS

The invention is explained in greater detail below with reference to the exemplary embodiments illustrated in the accompanying schematic drawings, in which.

DESCRIPTION OF THE PREFERRED EMBODIMENTS

Figure 1:
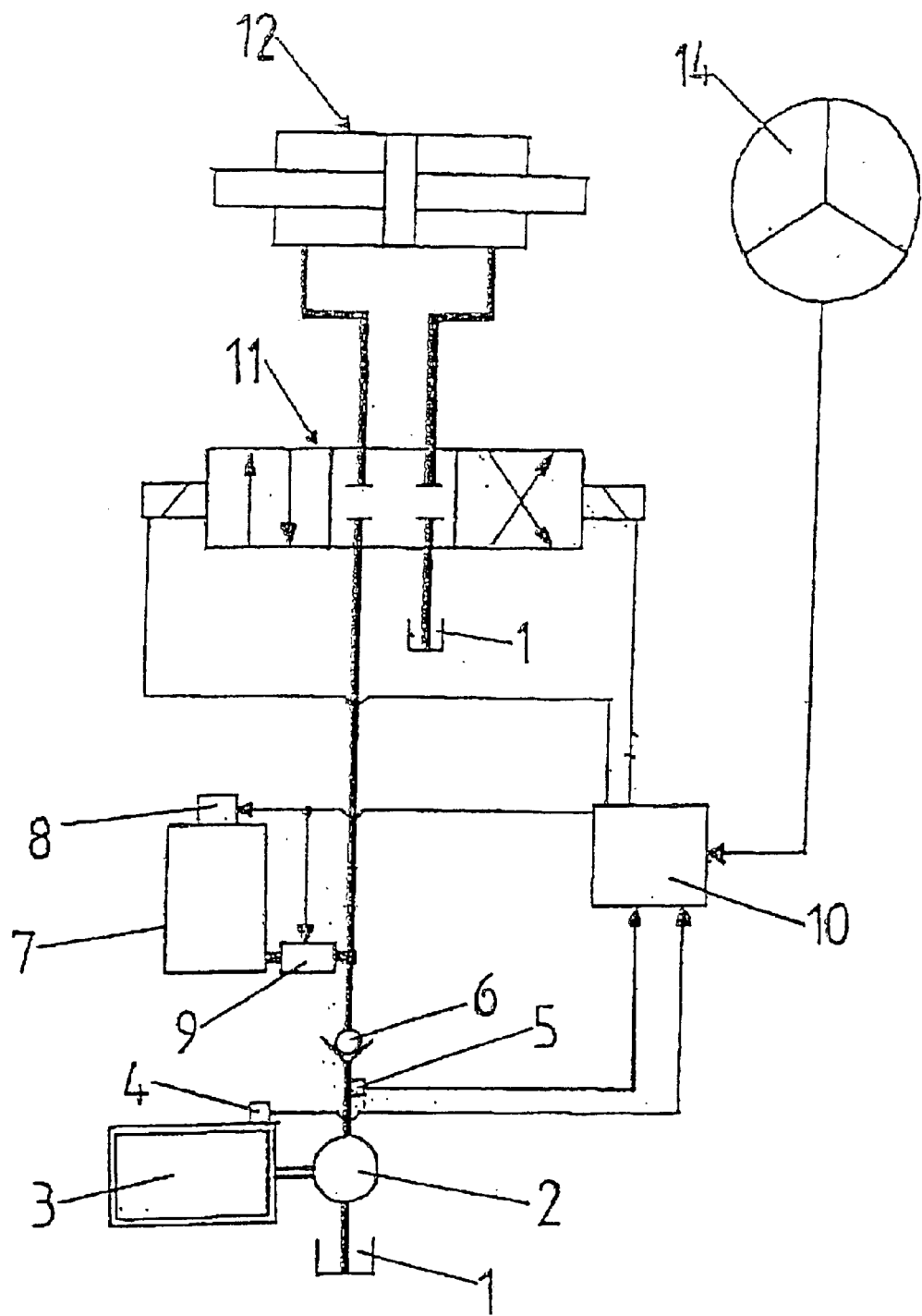
FIG. 1 is a schematic diagram (not to scale) of a steering system of the invention for use in an industrial truck that has a steering cylinder, steering pump, pressure monitoring system, control system, and a vessel with a gas generation cartridge.

FIG. 1 shows an exemplary hydraulic circuit for a steering system of an industrial truck having a tank 1 for hydraulic medium and a steering pump 2 which is driven by a drive 3. In this example, the drive 3 is a traction drive of the industrial truck. A speed-of-rotation sensor 4 is attached to the drive 3.

The hydraulic circuit has a pressure monitoring system 5 and a check valve 6. An exemplary emergency steering device having a vessel 7 can be placed in communication with the hydraulic circuit by means of a check valve 9 with an electrical override. A gas generation cartridge 8 is attached to the vessel 7. To control the steering system and the emergency energy supply by means of the gas generation cartridge, there is a control system 10 which is in communication via signal lines with one or more of the speed-of-rotation sensor 4, the pressure monitoring system 5, the gas generation cartridge 8, an electrically actuated steering valve 11, and a steering wheel 14. Instead of the steering wheel 14, a joystick can also be provided. The possible positions of the steering valve 11 determine the correspondence between the pressure line and the return line to the steering cylinder 12. The return line is connected to the tank 1.

The exemplary device described above functions as follows:

The steering pump 2 is driven by the drive 3 and sucks hydraulic medium out of the reservoir 1. The hydraulic medium is fed into the hydraulic circuit. The check valve 6 prevents a backflow of the hydraulic medium toward the steering pump 2. The hydraulic circuit is switched by the electrically actuated steering valve 11 so that the energy that acts on the steering cylinder 12 determines the direction of travel of the industrial truck depending on the instructions for the direction of travel input at the steering wheel 14 by the driver. For that purpose, setpoint signals from the steering wheel 14 are received by the control system 10 in the form of input values for the control system. The control system 10 controls the steering valve 11.

Figure 2:
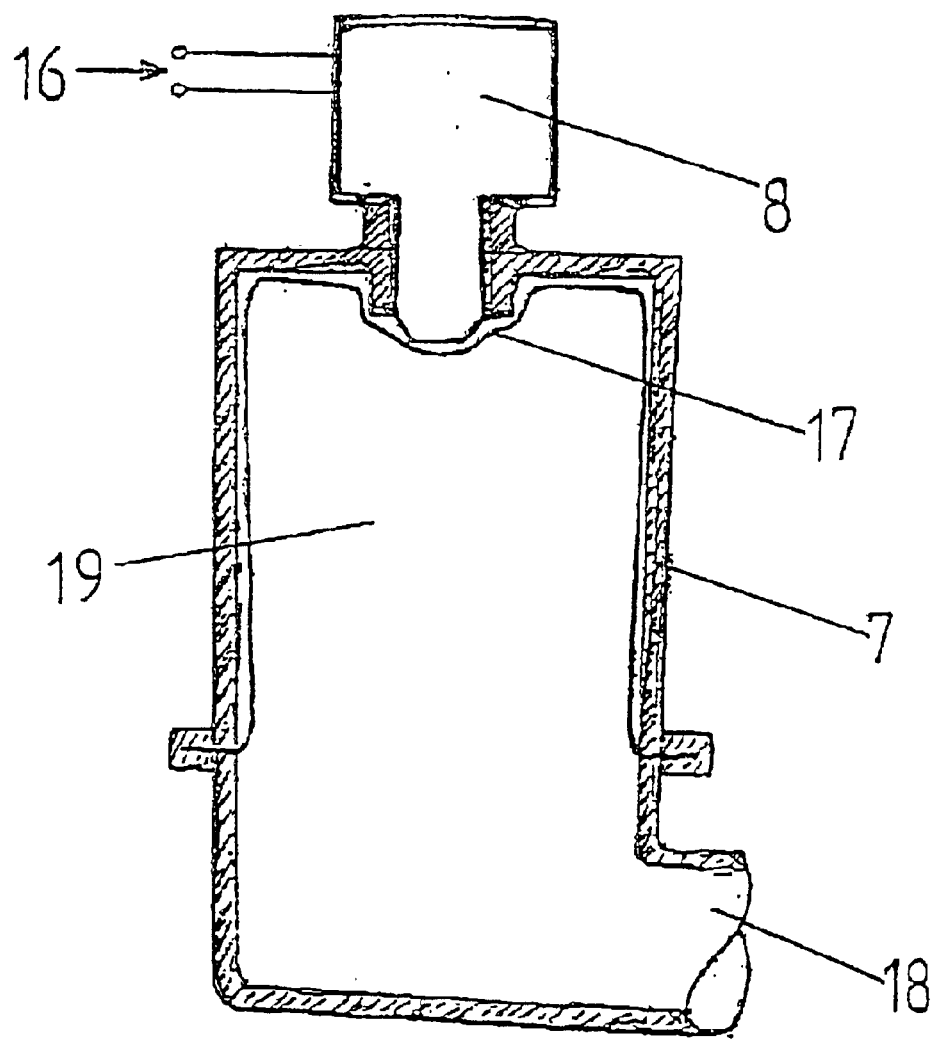
FIG. 2 is a sectional view (not to scale) of a vessel with a gas generation cartridge incorporating features of the invention.

The control system 10 also processes the measurements from the pressure monitoring system 5. These measurements can be used as input values for the control of the means for the activation of the gas generation cartridge 8. (An exemplary activation means is shown in FIG. 2.) If the pressure in the hydraulic circuit drops below a specified level, the control system 10 actuates the means for the activation of the gas generation and the gas generation is activated, e.g., electrically. The pressure decrease in the hydraulic circuit can be caused, for example, by a failure of the steering pump 2.

After the gas generation has been activated, gas flows into the vessel 7, as a result of which the pressure in the vessel 7 increases suddenly. This pressure increase is transmitted to the hydraulic medium which is admitted into the vessel 7 via the check valve 9. As a result, energy is available for a certain period of time for the hydraulic circuit, and the invention teaches that this energy makes possible movements of the steering cylinder 12 until the industrial truck is brought into a safe position.

After the industrial truck has been brought into a safe position, repairs can be made. For example, the steering pump 2 can be replaced with a new steering pump.

FIG. 2 shows a housing or vessel 7 with a gas generation cartridge 8 and a connecting pipe 18, as well as a membrane 17 which separates the space 19 (second space) for the hydraulic medium from the other space (first space) on the other side of the membrane 17 adjacent the gas generation cartridge 8. The gas generation can be triggered by an electrical activation mechanism 16. As a result of the pressure increasing after the activation of the gas generation on the side of the gas generation cartridge (i.e., as gas is directed into the first space), the membrane 17 applies pressure to the hydraulic medium admitted into the space 19 (second space) and thereby transmits energy to the hydraulic medium. The use of the separating membrane 17 has the advantage that gases that may not come in contact with the hydraulic medium can also be used in the gas generation cartridge.

When the gases used are inert with respect to the hydraulic medium, it can be advantageous to use a vessel without a membrane 17.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A device to ensure the steerability of an industrial truck having a hydraulic steering system, comprising:
   a hydraulic circuit;
   a vessel having an interior which can be connected with the hydraulic circuit of the steering system;
   at least one gas generation cartridge comprising a pyrotechnic cartridge in flow communication with the vessel such that gas generated by the pyrotechnic cartridge flows into the vessel to increase pressure in the hydraulic circuit; and
   means to activate the gas generation cartridge.

2. The device as claimed in claim 1, including a control system connected to the gas generation cartridge.

3. The device as claimed in claim 1, including a pressure monitoring system connected to a hydraulic circuit of the hydraulic steering system.

4. The device as claimed in claim 1, wherein the vessel includes a membrane which separates a space provided for gas from the gas generation cartridge from another space provided for hydraulic medium.

5. A method to ensure the steerability of an industrial truck with a hydraulic steering system, comprising the step of:
   triggering a gas generation cartridge comprising a pyrotechnic cartridge when a pressure in a hydraulic circuit of the hydraulic steering system drops below a preset value such that gas generated by the pyrotechnic cartridge flows into a vessel connected to the hydraulic circuit to increase pressure in the hydraulic circuit.

6. The method as claimed in claim 5, including utilizing a control system to activate means for the activation of the gas generation.

7. The method as claimed in claim 5, including measuring the pressure in the hydraulic circuit of the steering system.

8. The method as claimed in claim 5, including actuating the gas generation when at least one measured pressure value is below a specified limit.

9. The method as claimed in claim 5, wherein when the gas generation is activated, the generated gas is discharged into the vessel and the interior of the vessel is placed in communication with the hydraulic circuit.

10. The method as claimed in claim 9, including placing the vessel in communication with the hydraulic circuit such that the pressure increase in the vessel caused by the gas generation counteracts the pressure drop in the hydraulic circuit.

11. An emergency steering system for an industrial truck, comprising:
    a hydraulic steering system having a hydraulic circuit; and
    an emergency steering device in pressure communication with the hydraulic circuit, the emergency steering device comprising:
      a vessel having an interior;
      a flexible membrane dividing the vessel interior into a first space and a second space; and
      a gas generation device comprising a pyrotechnic cartridge configured to direct gas from the pyrotechnic cartridge into the first space,
    wherein the second space is in flow communication with hydraulic fluid in the hydraulic circuit such that when the gas generation device is activated the generated gas from the pyrotechnic cartridge in the first space exerts a pressure on the flexible membrane which in turn exerts a pressure on hydraulic fluid in the second space to increase hydraulic fluid pressure in the hydraulic circuit.

12. A method of providing emergency steering for an industrial truck, comprising the steps of:
    placing an emergency steering device in pressure communication with an industrial truck hydraulic steering system having a hydraulic circuit, the emergency steering device comprising:
      a vessel having an interior;
      a flexible membrane dividing the vessel interior into a first space and a second space; and
      a gas generation device comprising a pyrotechnic cartridge configured to direct gas from the pyrotechnic cartridge into the first space; and
    activating the gas generation device to direct gas from the pyrotechnic cartridge into the first space such that the gas exerts a pressure on the flexible membrane which in turn exerts a pressure on hydraulic fluid in the second space to increase hydraulic fluid pressure in the hydraulic circuit.

* * * * *